US 10,544,754 B2

(12) United States Patent
Bunel et al.

(10) Patent No.: US 10,544,754 B2
(45) Date of Patent: Jan. 28, 2020

(54) FIXED STRUCTURE OF A THRUST REVERSER DEVICE

(71) Applicant: AIRCELLE, Gonfreville l'Orcher (FR)

(72) Inventors: Serge Bunel, Le Havre (FR); Alexandre Bellanger, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 603 days.

(21) Appl. No.: 14/643,555

(22) Filed: Mar. 10, 2015

(65) Prior Publication Data
US 2016/0273489 A1 Sep. 22, 2016

Related U.S. Application Data (63) Continuation of application No. PCT/FR2013/052135, filed on Sep. 17, 2013.

(30) Foreign Application Priority Data

Sep. 19, 2012 (FR) ..................... 12 58769

(51) Int. Cl.
*F02K 1/72* (2006.01)
*B64D 27/18* (2006.01)

(52) U.S. Cl.
CPC ............ *F02K 1/72* (2013.01); *B64D 27/18* (2013.01); *Y02T 50/672* (2013.01)

(58) Field of Classification Search
CPC ..... F02K 1/64; F02K 1/70; F02K 1/72; F02K 1/605; B64D 27/18; Y02T 50/672
USPC ............ 239/265.19, 265.25, 265.27, 265.31, 239/265.33; 60/230, 232
See application file for complete search history.

(56) References Cited

U.S. PATENT DOCUMENTS

| 4,278,220 A * | 7/1981 | Johnston ................ F02K 1/72 244/110 B |
| 7,484,356 B1 * | 2/2009 | Lair ...................... F02K 1/72 60/226.2 |
| 2010/0064660 A1 | 3/2010 | Vauchel et al. |
| 2010/0107599 A1 * | 5/2010 | Vauchel ................ B64D 29/08 60/226.2 |

(Continued)

FOREIGN PATENT DOCUMENTS

| RU | 2135397 | 8/1999 |
| WO | 2011/073551 A1 | 6/2011 |

OTHER PUBLICATIONS

International Search Report dated Nov. 11, 2013 in International Application No. PCT/FR2013/052135.

*Primary Examiner* — Mark A Laurenzi
*Assistant Examiner* — Loren C Edwards
(74) *Attorney, Agent, or Firm* — Burris Law, PLLC (57) ABSTRACT

The present disclosure relates to a thrust reverser device for a turbo jet engine nacelle including a fixed thrust reverser support structure having a longitudinal support half beam able to support a thrust reverser half-cowl, and the thrust reverser half-cowl mounted such that it can slide on the fixed structure in a direction substantially parallel to a longitudinal axis of the device via a guidance assembly, between a direct-jet position and a reverse-thrust position. In particular, the fixed structure includes a structure for offsetting the guidance assembly that guides the half-cowl circumferentially in a plane radial to the longitudinal axis between its various positions with respect to the half-beam on which the half-cowl is mounted.

19 Claims, 7 Drawing Sheets

(56) References Cited

U.S. PATENT DOCUMENTS

2011/0120078 A1* 5/2011 Schwark, Jr. ............. F02K 1/72
60/226.2
2011/0318173 A1* 12/2011 Ramlaoui .............. B64D 29/06
415/182.1

* cited by examiner

FIXED STRUCTURE OF A THRUST REVERSER DEVICE

CROSS-REFERENCE TO RELATED APPLICATIONS

This application is a continuation of International Application No. PCT/FR2013/052135, filed on Sep. 17, 2013, which claims the benefit of FR 12/58769, filed on Sep. 19, 2012. The disclosures of the above applications are incorporated herein by reference.

FIELD

The present disclosure relates to a thrust reverser called cascade-type thrust reverser, for a jet engine.

BACKGROUND

The statements in this section merely provide background information related to the present disclosure and may not constitute prior art.

An aircraft engine, which is generally of the turbojet engine type, is placed inside a nacelle which, among other functions:
provides the aerodynamic fairing of the engine,
allows channeling the external air toward the engine,
allows connecting the engine to the aircraft.

Indeed, the nacelle generally exhibits a tubular structure comprising an air inlet upstream of the turbojet engine, a mid-section intended to surround a fan of the turbojet engine, a downstream section intended to surround the combustion chamber of the turbojet engine and accommodating, if appropriate, thrust reversal means.

Modern nacelles are intended to accommodate a bypass turbojet engine capable of generating via the blades of the rotating fan a hot air flow (also called primary flow) coming from the combustion chamber of the turbojet engine, and a cold air flow (secondary flow) which circulates outside the turbojet engine through an annular passage, also called flow path, formed between a fairing of the turbojet engine and an inner wall of the nacelle. The two air flows are ejected from the turbojet engine from the rear of the nacelle.

The downstream section of a nacelle for such a turbojet engine generally exhibits a fixed outer structure, called Outer Fixed Structure (OFS) and a concentric fixed inner structure, called Inner Fixed Structure (IFS), surrounding a downstream section of the turbojet engine accommodating the gas generator of the turbojet engine.

The fixed inner and outer structures define the flow path intended to channel the cold air flow which circulates outside the turbojet engine.

In a particular case of a cascade-type thrust reverser device, the means implemented to perform redirection of the cold air flow comprise cascade vanes of the cold air flow and a cowl.

This movable cowl is displaceable between, on the one hand, a deployed position in which it opens a passage within the nacelle intended for the diverted cold air flow, and on the other hand, a retracted position in which it closes this passage, the cowl having only a simple sliding function aiming to uncover or cover these cascades.

More precisely, the thrust reverser device comprises two semi cylindrical half-cowls, mounted so as to be able, in particular during maintenance operations, to be open «like a butterfly» by pivoting around a longitudinal hinge line, in the vicinity of a nacelle suspension pylon by which the nacelle is connected to the wing or to the fuselage of the aircraft.

Such a structure is called C-duct.

Each one of the two half-cowls is slidably mounted on a half-beam pivotally mounted on the pylon, the rotational movement of each half-beam on the pylon providing pivoting of each half-cowl relative to this pylon for the maintenance operations.

The sliding movement of each half-cowl on its associated half-beam allows making the thrust reverser pass from the direct jet configuration to the reverse jet configuration, and vice versa.

Each half-beam comprises, typically, on its outer face, primary and secondary rails capable of allowing movement of the associated half-cowl, and a plurality of hinge clevisses capable of allowing articulation of the half-beam 1 on the associated pylon.

The assembly formed by the half-beam, its rails and its hinge clevisses, is often referred to as 12 o'clock structure, given its position at the top of the circle defined by a nacelle section, and by analogy with the dial of a clock.

Moreover, in order to provide the aerodynamic continuity of the lines of the nacelle and because of an interference with the wing of the aircraft during the reverse jet phases, an aerodynamic fairing panel can be mounted on either side of the suspension pylon, by surmounting, at the upper portion, the half-cowls.

Each one of these panels is connected to the beam at the side of the interference with the wing, or connected to the cowl at the side opposite to the interference.

Due to the presence of the removable aerodynamic fairing panel between the cowl and the beam, the rail-slide guiding system of the beam and the cowl exhibits a significant cantilever relative to the beam.

This configuration is not sustainable.

Indeed, during the deployment of the movable cowl during the thrust reversal phase, there are risks of jamming of the rail in the slide.

Thereby, the cantilever, of about 500 mm, requires multiplying the width of the considered rail, in order to avoid any risk of jamming of the rail in the slide.

However, this enlargement of the rail results in the lengthening of the corresponding slide on the beam, and consequently a modification of the external aerodynamic lines of the nacelle.

This impact on the aerodynamic lines is an unacceptable consequence insofar as this results in an increase of drag and hence a decrease of the aerodynamic performances of the thrust reverser in direct jet and an approaching of the thrust reverser toward the wing of the aircraft.

Then, it becomes impossible for the constructor to hold the clearances with the wing, which are required by the aircraft manufacturer.

In addition, such a slidably guiding structure of the half-cowls in a long cantilever offers much flexibility to the nacelle, thereby making it more sensitive to deformations.

Thereby, it is necessary to control the resistance to loads of the assembly, in particular to fatigue, by imposing productions in composite materials.

However, such composite materials imply complex and costly design developments.

SUMMARY

The present disclosure provides a thrust reverser device in which the cantilever, related to the mounting of a half-cowl on the corresponding 12 o'clock structure, is reduced.

The present disclosure also provides a thrust reverser device in which aerodynamic lines may be kept limited, in order to reduce the aerodynamic drag.

The present disclosure also provides a thrust reverser device allowing a mounting of each thrust reverser half-cowl, which is easy, quick and simple to implement.

The present disclosure further provides a thrust reverser device which limits the risks of jamming of the thrust reverser cowl during these displacements.

The present disclosure provides a thrust reverser device allowing eliminating the need of realizing a 12 o'clock structure in composite materials.

The present disclosure also reduces the loads which pass through the guiding assemblies of each thrust reverser half-cowl during their displacements toward their different direct and reverse jet positions while preserving proper mass of the thrust reverser device.

The present disclosure provides a thrust reverser device for a turbojet engine nacelle comprising, at least:
one fixed support structure for a thrust reverser, comprising a longitudinal support half-beam capable of supporting a thrust reverser half-cowl,
the thrust reverser half-cowl slidably mounted on the fixed structure along a direction substantially parallel to a longitudinal axis of the device, by a guiding assembly, between at least one direct jet position and one thrust reversal position,
the thrust reverser device being remarkable in that the fixed structure further comprises means adapted to circumferentially shift, in a plane radial to the longitudinal axis, the guiding assembly of the cowl between its different positions relative to the half-beam on which the half-cowl is mounted.

Thanks to the present disclosure, this shift allows avoiding any interference between an aerodynamic fairing panel mounted on one side of the fixed structure and the guiding means of the cowl, thereby reducing the cantilever of the guiding means of the half-cowl relative to the corresponding half-beam.

According to other features of the thrust reverser according to the present disclosure, taken alone or in combination:
- said shifting means comprise an intermediate support frame mounted between the half-beam and the half-cowl, configured to angularly shift relative to the half-beam, in a plane radial to the longitudinal axis, the guiding assembly of the cowl;
- the intermediate support frame forms a frame which extends on the one hand over the length of the corresponding half-beam and, on the other hand, over an angular sector of a nacelle front frame;
- the intermediate support frame is formed of at least:
  two opposite lateral profiles extending over its length, namely a first and a second lateral profile,
  two opposite transverse profiles extending over its width, namely an upstream transverse profile and a downstream transverse profile,
  securing means arranged on the first lateral profile designed for securing the intermediate support frame on the half-beam and
  the guiding means of the half-cowl arranged on the second lateral profile;
- the securing means comprise a peripheral connecting flange which lies in a plane perpendicular to the upstream and downstream transverse profiles;
- the second lateral profile comprises at least one longitudinal guiding slide capable of cooperating with a guiding rail mounted on said half-cowl or vice versa to provide sliding of the corresponding half-cowl between a direct jet position and a thrust reversal position or vice versa;
- the guiding rail is associated with a retaining rod supporting a skid mounted on an outer half-shroud of the half-cowl and connecting it to the corresponding slide, this rod may be straight or bent;
- the device further comprises means for preventing jamming of the rails in the corresponding slides;
- the intermediate support frame is shaped so that the guiding means are arranged around said longitudinal axis at an angular distance from the half-beam larger than or equal to the angular distance between the free longitudinal end of an aerodynamic fairing panel mounted on the half-beam and the half-beam;
- the intermediate support frame further comprises upstream connecting means arranged on the upstream transverse edge designed for connecting the intermediate support frame on the nacelle front frame, these upstream connecting means being designed for an overlapping connection of the intermediate support frame and of the front frame, and comprise one or several through orifice(s) adapted to receive securing means intended to secure the intermediate support frame and the front frame;
- the thrust reverser device further comprises means enabling any rotation of a rear frame relative to the intermediate support frame on which it is mounted;
- the intermediate support frame comprises downstream connecting means arranged on the downstream transverse edge designed to provide a ball-joint type connection between the rear frame and the intermediate support frame;
- the intermediate support frame comprises one or several recess(es) adapted to receive and serve as a bearing surface for one or several cascade vane(s) of flow between the different profiles;
- the intermediate support frame further comprises one or several reinforcing rib(s) for taking up the transverse loads formed on one or several of the transverse profiles;
- the means adapted to circumferentially shift, in a plane radial to the longitudinal axis, the guiding assembly of the half-cowl comprise:
  complementary downstream connecting means arranged on the guiding assembly and the rear frame designed to provide a connection between the rear frame and the guiding assembly of the cowl circumferentially shifted, in a plane radial to the longitudinal axis, relative to the half-beam on which the half-cowl is mounted;
  complementary upstream connecting means arranged on the guiding assembly and the front frame designed to provide a connection between the guiding assembly and the front frame circumferentially shifted, in a plane radial to the longitudinal axis, relative to the half-beam on which the half-cowl is mounted;
- the upstream connecting means comprise means enabling any rotation of the guiding assembly relative to the front frame on which it is mounted;
- the upstream connecting means are designed to provide a ball-joint type connection between the front frame and the upstream end of the guiding assembly;

the upstream connecting means comprise means preventing any rotation according to the longitudinal axis of the guiding assembly relative to the front frame on which it is mounted;

the upstream connecting means comprise a first ball-joint type connection between the guiding assembly and the front frame associated with an element preventing the rotation according to the longitudinal axis of the guiding assembly;

said element preventing the rotation comprises a blocking finger extending along the longitudinal axis and adapted to cooperate with a through orifice arranged on the front frame.

The present disclosure further concerns a nacelle comprising a thrust reverser device as aforementioned.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It will be noted that a three-axes X, Y Z reference frame has been defined in the description, these three axes being representative:

of the longitudinal direction of the turbojet engine for the axis X, of the direction leading from the longitudinal axis of the turbojet engine to the longitudinal axis of the pylon for the direction Z and, of the direction orthogonal to X and Z for the axis Y.

In the case of a propulsion assembly mounted under the wing, the axis Z is generally vertical.

In the description below, the vertical axis will be assimilated to the axis Z, even if the propulsion assembly is mounted according to another configuration, such as for example at the rear fuselage, this for simplicity purposes.

It will be also noted that the terms upstream and downstream are meant in relation to the advance direction of the aircraft encountered as a result of a thrust exerted by the turbojet engine.

By upper (lower), it is meant the position proximate (respectively opposite) to the suspension pylon when the nacelle is mounted under a wing of an aircraft. Usually, the lower (upper) position is called the 6 o'clock (respectively 12 o'clock) position by analogy with the positioning of the hands on the dial of a clock.

Figure 1:
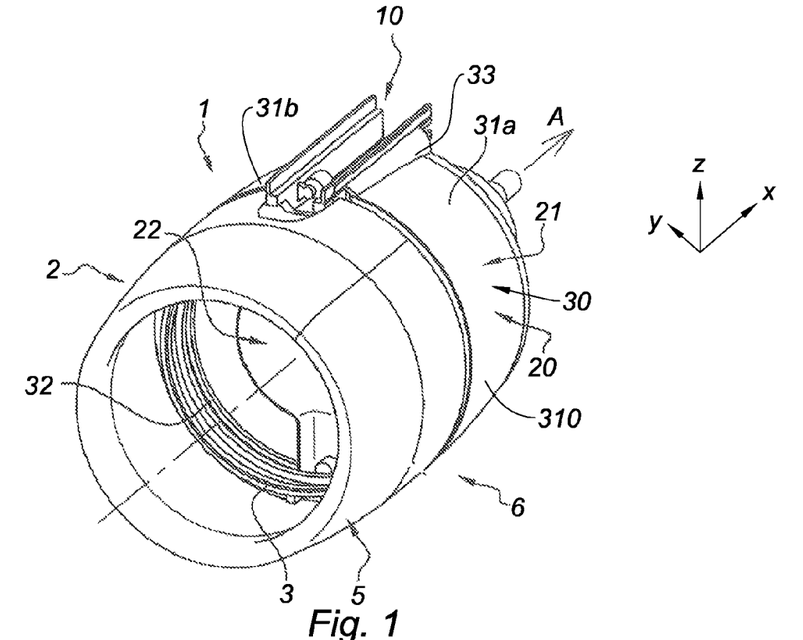
FIG. 1 is a perspective view of a turbojet engine nacelle exhibiting a thrust reverser including a "C-duct" type movable cowl in the intermediate open position.
Figure 2:
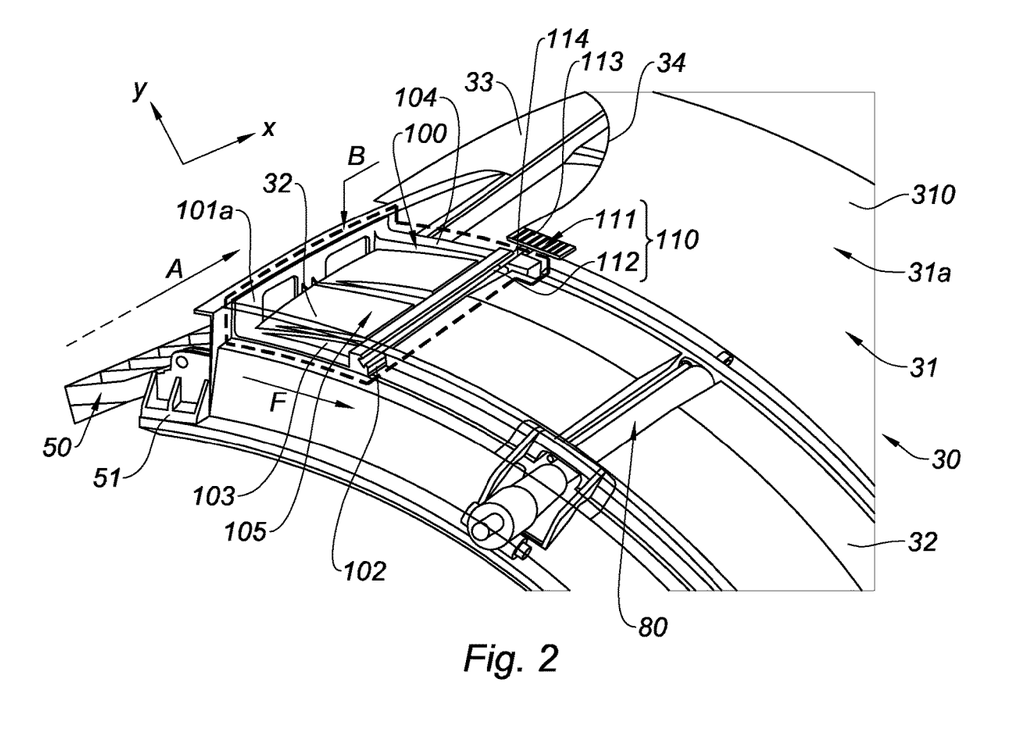
FIG. 2 is a partial perspective view of a thrust reverser according to a first form of the present disclosure.
Figures 3, 4:
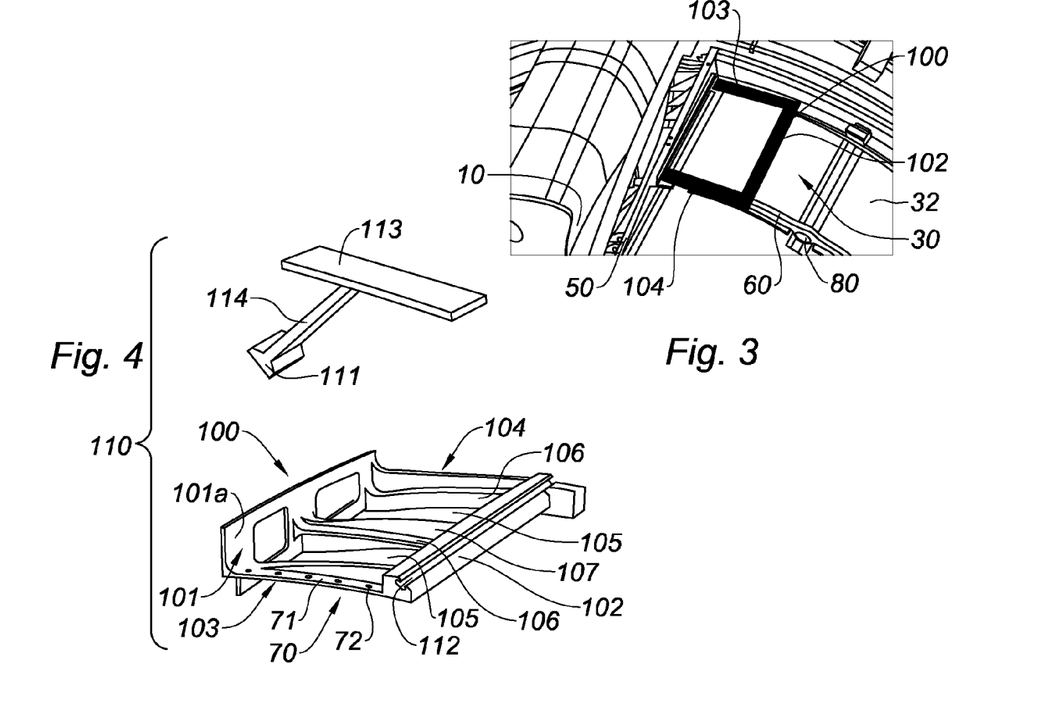
FIG. 3 is a top view of the nacelle of FIG. 1 incorporating the thrust reverser of FIG. 2 in which the thrust reverser cowl has been removed.
FIG. 4 is an exploded perspective view of a guiding assembly of the reverser of FIG. 2 associated with an intermediate support frame of a fixed structure of the nacelle according to the first form of the present disclosure.

Referring to FIGS. 1 to 3, an aircraft propulsion assembly 1 comprises a nacelle 2 surrounding a turbojet engine (not illustrated) which both exhibit a central longitudinal axis A corresponding to the axis X.

This nacelle 2 is intended to be fastened under a wing of an aircraft (not visible) via a suspension pylon 10 directed toward the upstream of the aircraft.

The turbojet engine comprises a fan 3 delivering an annular air flow with a primary flow which supplies the engine driving the fan 3 and a secondary flow which is ejected in the atmosphere while providing a significant fraction of the thrust of the aircraft.

As a reminder, the nacelle 2 typically comprises an outer structure comprising an air inlet upstream structure 5, a mid-structure 6 surrounding blades of the fan 3 of the turbojet engine, and a downstream structure 20 that may accommodate a thrust reverser device 30.

The downstream structure 20 comprises an outer structure 21 called OFS accommodating the thrust reverser device 30, this outer structure 21 defining, with a concentric inner structure 22 including a fairing of the engine downstream of the blades of the fan, called IFS, an annular air flow path through which the secondary air flow is intended to circulate, in opposition to the generated hot primary flow.

The thrust reversal means 30 comprise a cowl 31 mounted movable in longitudinal translation along a direction substantially parallel to the longitudinal axis A of the nacelle 2 associated with cascade vanes 32 of air flow, each exhibiting a plurality of flow deflecting blades and flaps (not visible in these figures) adapted to obturate the annular flow path during a thrust reversal.

This thrust reverser cowl 31 is capable of alternately pass from a closed position in which it provides the aerodynamic continuity of the external lines of the nacelle 2 with the mid-section 6 and covers the cascade vanes 32 of air flow, to an open position in which it opens a passage in the nacelle 2 by uncovering the cascade vanes 32.

The cascade vanes 32 are capable of redirecting a portion of the secondary air flow generated by the turbojet engine toward the front of the nacelle 2 through the thus cleared opening.

Figure 6:
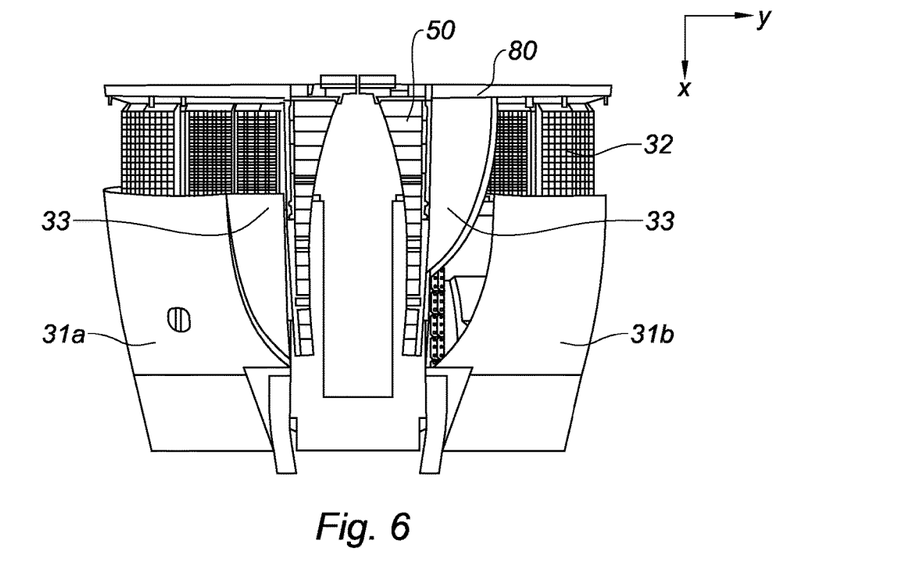
FIG. 6 is a top view of the nacelle of FIG. 1 in which the thrust reverser cowl is in the reverse jet position toward the downstream of the nacelle.

The position represented in FIG. 1 is an intermediate position of the cowl 31 between its closed and open positions whereas the position represented in FIG. 6 is a fully open position of the cowl 31 uncovering the cascade vanes 32 of air flow.

The cowl 31 includes two removable semi-cylindrical half-cowls 31a, 31b, exhibiting, respectively, upper edges 34 intended to be indirectly mounted on the suspension pylon 10.

Each one of these half-cowls 31a, 31b comprises an outer half-shroud 310 and an inner half-shroud (not illustrated) intended to delimit, in a direct jet position of the turbojet engine, an outer wall of the flow path.

More precisely, each one of the two half-cowls 31a, 31b is slidably mounted on a longitudinal support half-beam 50, called 12 o'clock beam between its «direct jet» position and its thrust reversal position in which it clears the reverser cascades 32, allowing directing a portion of the air flow circulating in the flow path toward the front of the nacelle.

This longitudinal support half-beam 50 is only visible in FIGS. 2, 3, 6 and 8.

This half-beam 50, which belongs to the fixed structure of the thrust reverser, is intended, in particular, to receive the guiding assembly 110 allowing to perform the sliding of the thrust reverser 30 between its direct jet and reverse jet positions along the longitudinal axis A.

By the term «guiding assembly», it is meant, in the context of the present disclosure, any means allowing to guide the sliding of the cowl between these different positions, namely any means allowing to impose a path on the cowl: these means are separate from cylinder-type actuating means whose function is to actuate the sliding and not guide it.

Thus, the guiding assembly may comprise any known guiding means, and in particular and not exclusively, of the type sliders on rail, rails-slides, rollers skids system capable of cooperating with a corresponding rail.

Thereafter, the description will be made regarding a particular non-restrictive form comprising a rail-slide guiding assembly.

Moreover, the longitudinal support half-beam 50 is also associated to a plurality of hinge clevisses (not illustrated) capable of allowing articulation of the half-beam 50 on the pylon 10, for the maintenance operations.

Moreover, each half-beam 50 comprises one or several spacer(s) 51 mounted on the upstream portion (relative to the direction of the air flow in the nacelle) of the half-beam 50, thereby allowing to secure a front frame 80 (illustrated in FIG. 6) intended to support the cascades 32 of the thrust reverser 30.

The circular front frame 80 is in fact composed of two front half-frames allowing securing this thrust reverser on the fan casing of the mid-section of the nacelle, the ends of each of these half-frames being connected respectively to the upper half-beam 50 and to a lower half-beam (not illustrated), at 6 o'clock.

The deflection cascades 32 are secured between the peripheral front frame and a peripheral rear frame 60 (illustrated in FIG. 3), downstream, which generally join together the outer half-shroud 310 and the inner half-shroud of the cowl 31a, 31b.

Figures 8, 9:
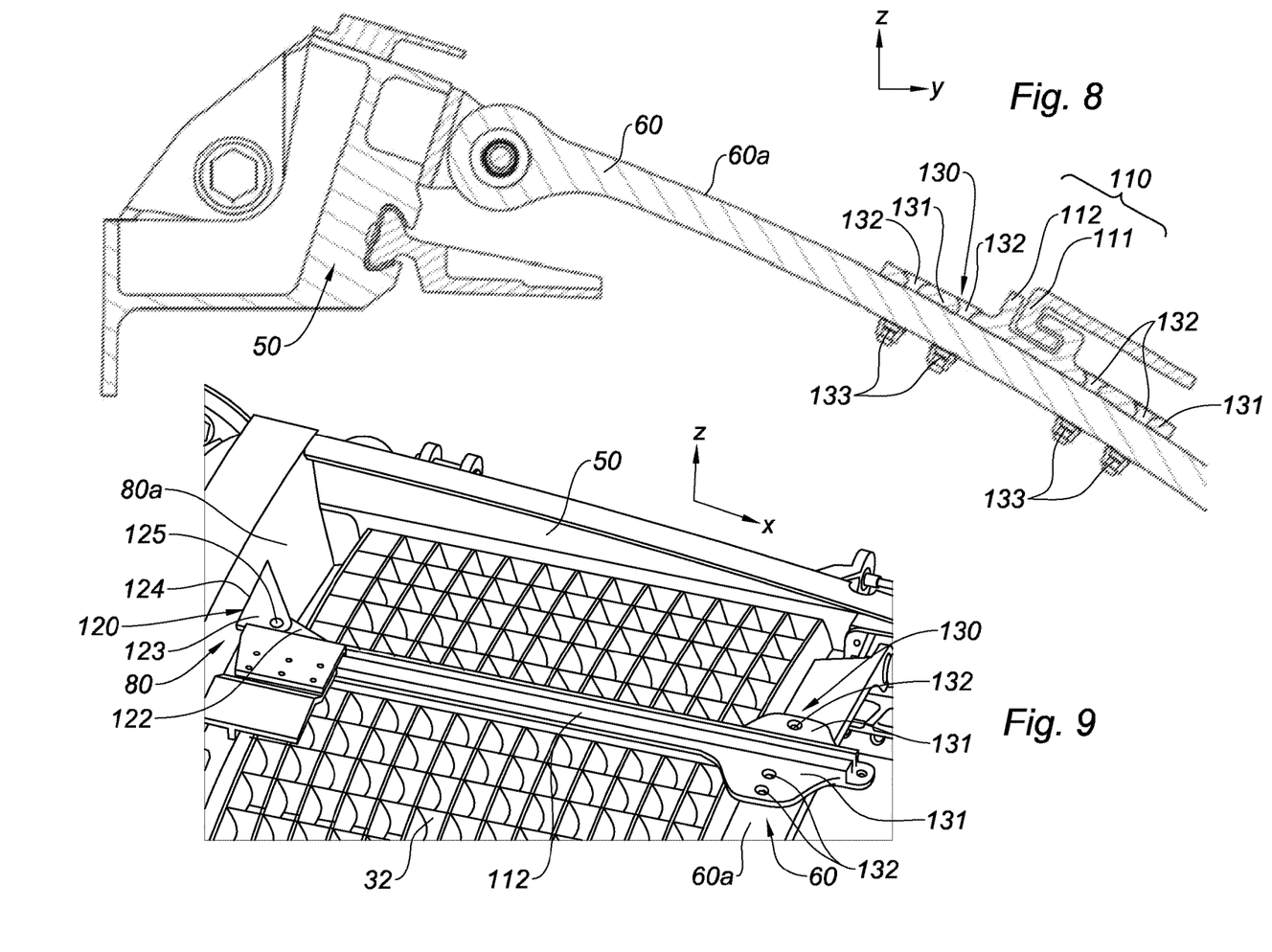
FIG. 8 is a sectional view of the thrust reverser of FIG. 7, the aerodynamic fairing panel having been removed.
FIG. 9 is a partial perspective view of a variant of the thrust reverser according to a second form of the present disclosure of FIG. 7, the aerodynamic fairing panel having been removed.

As illustrated in FIG. 8, this rear frame 60 is in fact composed of two rear half-frames, each being pivotally mounted around the axis X on the corresponding longitudinal support half-beam 50.

Moreover, referring to FIGS. 1, 2, 6 and 7, in order to provide the aerodynamic continuity of the lines of the nacelle 2, an aerodynamic fairing panel 33, may be mounted on either side of the suspension pylon 10 (not represented in FIGS. 6 and 7), by surmounting at the upper portion, the half-cowls 31a, 31b.

Each of these panels 33 is mounted, hinged or not, on the half-beam 50 along an axis parallel to the longitudinal axis X.

Each of these panels 33 may be mounted, fixed or movable, relative to the suspension pylon 10.

The description which follows is made with reference to FIGS. 1 to 15 and with reference to only one half-cowl 31a, 31b, given that it is applicable on either side of the suspension pylon 10 for each of the half-cowls 31a, 31b.

In a first form more particularly illustrated in FIGS. 2 to 5, in order to provide these particular displacements of the half-cowl 31a and allow attaching of the latter, the fixed structure of the thrust reverser 30 comprises an intermediate support frame 100 interposed between the half-beam 50 and the half-cowl 31a.

This intermediate support frame 100 is configured to angularly shift relative to the half-beam 50, in a plane radial to the longitudinal axis X, the guiding assembly 110 of the half-cowl 31a.

This translational guiding assembly 110 of the half-cowl 31a is constituted of a rail 111-slide 112 assembly extending along the longitudinal axis A of the nacelle 2, on either side of the suspension pylon 10.

The rails-slides assemblies 110 are mounting means which are simple to implement.

The intermediate support frame 100 is a quadrilateral which extends, on the one hand, over the length of the corresponding half-beam 50 and, on the other hand, over an angular sector of the front frame 80, around the axis X of the nacelle.

It comprises an upstream portion intended to be secured to the front frame 80 and a downstream portion intended to be secured to the rear frame 60 supporting the cascades 32.

This intermediate support frame 100 is, thus, formed of at least:

two opposite lateral profiles extending over its length, namely a first 101 and a second 102 lateral profiles extending substantially along the axis X and the half-beam 50, connecting means arranged on the first lateral profile 101 designed for securing the intermediate support frame 100 on the corresponding half-beam 50, two opposite transverse profiles 103, 104 extending over its width, namely an upstream transverse profile 103 and a downstream transverse profile 104, located respectively in the upstream and downstream portions of the support frame 100, perpendicular to the lateral profiles 101, 102.

The opposite transverse profiles 103, 104 are connected, each, at one of their ends, to the first lateral profile 101 and, at their opposite end, to the second lateral profile 102.

These different connections form the skeleton of the intermediate support frame 100 which, moreover, comprises, between these different profiles, recesses 105 to optimize the mass of the structure.

By length of the intermediate support frame 100, it is meant its longitudinal dimension taken along a direction parallel to the axis X of the nacelle in place on the thrust reverser 30 and extending between the two transverse profiles 103, 104.

By width of the intermediate support frame 100, it is means its dimension taken along a direction Y substantially perpendicular to the axis X of the nacelle in place on the thrust reverser and extending between the two lateral profiles 101, 102.

In accordance with the present disclosure, the guiding assembly 110 of the half-cowl 31a is, in part, arranged on the second lateral profile 102, the farthest from the corresponding half-beam 50.

Thus, the rail 111-slide 112 guiding assembly 110 and the sliding of the half-cowl 31a is offset relative to the half-beam 50 in the direction of the arrow F in FIG. 2, by the width of the intermediate support frame 100.

The angular or circumferential shift of the rail-slide guiding assembly 110 is determined so as to arrange the rail-slide guiding assembly 110 of the half-cowl 31a at an angular distance from the half-beam 50 larger than or equal to the angular distance at which is located the free lateral end of the aerodynamic fairing panel 33 mounted on the corresponding half-beam 50.

By providing connection between the half-beam 50 and the guiding assembly 110, the intermediate support frame 100 allows clearing the area located under the fairing panel 33 so that the guiding assembly 110 of the half-cowl 31a on the corresponding half-beam 50 no longer interferes, as was the case in the prior art, with the fairing panel 33.

Thus, the cantilever of the guiding means 110 of the half-cowl 31a relative to the corresponding half-beam 50 is reduced.

This fairing panel 33 is no longer an obstacle to the proper operation of the sliding of the thrust reverser cowl 31 between its direct jet and reverse jet positions.

Concerning more particularly the guiding means 110, they comprise at least the longitudinal guiding slide 112 arranged on the second lateral profile 102 of the intermediate support frame 100 capable of cooperating with the guiding rail 111 mounted on said half-cowl 31a or vice versa, to provide the sliding of the corresponding half-cowl 31a between a direct jet position and a thrust reversal position or vice versa.

Each rail 111 is adapted to allow the sliding of the half-cowl 31a in the longitudinal slide 112 extending along the longitudinal axis A of the nacelle 2, arranged on the intermediate support frame facing the upper edge 34 of the half-cowl 31.

In the presented form, each rail 112 is mounted on a planar skid 113 connecting the rail 111 to the outer half-shroud 310 of the half-cowl 31a.

The slide 112 is in the form of a longitudinal groove extending along the axis A, cylindrical, partially open longitudinally over its circumference.

This longitudinal opening is intended to the passage of a retaining rod 114 supporting the associated rail 111 which connects it, via the skid 113, to the outer half-shroud 310 of the half-cowl 31a.

Moreover, in one form of the present disclosure, the device further comprises means for inhibiting jamming of the rail 111 in the corresponding slide 112: thus, it may be provided that the retaining rods 114 are bent, in order to be able to adapt to the various aerodynamic configurations encountered on the nacelles and also to have a direction of the various load reactions which are less likely to cause jams.

Thus, the buttressing phenomenon, between the rails 111 of the cowl 31 and the corresponding slides 112 at the upper portion of the cowl 31, which is likely to block the movement of the rails 111, is limited.

Other variants of the anti-jamming means may be considered.

In another variant, not exclusive of the preceding one, it may be envisaged to arrange the slide(s) 112 on the half-cowl 31a and the rail 11 on the intermediate support frame 100.

Concerning the mounting of the intermediate support frame 100 in its environment on the thrust reverser 30, the means for securing the intermediate support frame 100 on the corresponding half-beam 50 comprise a peripheral connecting flange 101a which lies in a plane perpendicular to the transverse profiles 103, 104.

This flange 101a forms the first lateral profile 101 of the intermediate support frame and is adapted to rest and form a plane bearing connection with a corresponding element of the half-beam 50 and then to be secured thereto.

In a non-restrictive variant of the present disclosure, securing the flange 101a on the corresponding element of the half-beam 50 is provided by screwing means.

The intermediate support frame 100 further comprises upstream connecting means 70 arranged on the upstream transverse profile 103 and designed for connecting the intermediate support frame 100 on the nacelle front frame.

These upstream connecting means 70 are designed to provide an overlapping connection of the intermediate support frame 100 and of the front frame.

In a variant, they may comprise a protrusion 71 extending from the upstream transverse profile toward the front frame, over the whole length of the upstream transverse profile 103, this protrusion 71 being adapted to overlap a complementary element arranged on the front frame.

In addition, one or several through orifice(s) 72 adapted to receive securing means intended to secure the intermediate support frame 100 and the front frame is/are distributed over this protrusion 71.

Moreover, the thrust reverser device 30 further comprises means enabling any rotation of the rear frame 60 relative to the intermediate support frame on which it is mounted.

The intermediate support frame 100 thus comprises downstream connecting means arranged on the downstream transverse profile 104 designed to provide a ball-joint type connection between the rear frame 60 and the intermediate support frame 100.

Figure 5:
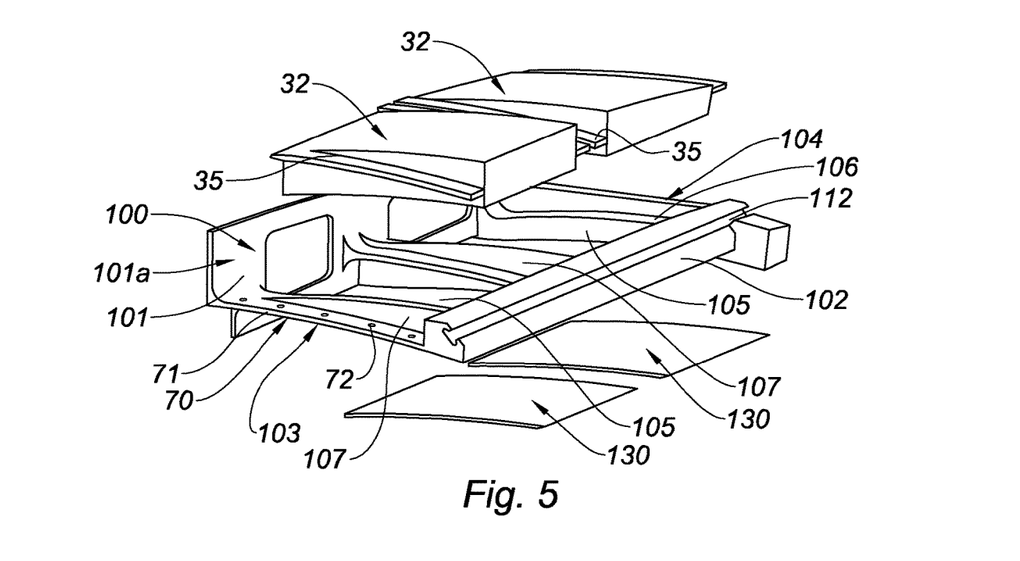
FIG. 5 is a partial exploded perspective view of the area B of the thrust reverser of FIG. 2.

As illustrated in particular in FIGS. 2 and 5, the intermediate support frame 100 is adapted to house one or several flow deflection cascade(s) 32 between the different profiles 101, 102, 103, 104 in the formed recesses 105.

Thus, the transverse profiles 103, 104 comprise on their inner face directed toward the inside of the support frame 100 and in a facing manner, shoulders 106 allowing to serve as a bearing surface for one or several flow deflection cascade(s) 32 and, more particularly, for securing tabs 35 protruding from the deflection cascades 32 intended to rest on the corresponding shoulders 106 and to be secured thereto.

In the variant in which the aerodynamic fairing panel 33 is fixed, the intermediate support frame 100 comprises elements 130 for obturating the recesses 105, as illustrated in FIG. 5.

Thus, the intermediate support frame 100 may be adapted to several nacelle configurations either by allowing the mounting of deflection cascades 32 or by providing elements 130 for obturating the recesses 105, thereby making the intermediate support frame solid.

Thereby, the production of this type of part is facilitated and the associated manufacturing costs are reduced.

As illustrated in FIGS. 2 to 4, the intermediate support frame 100 further comprises one or several reinforcing rib(s) 107 for taking up the transverse loads formed on one or several of the transverse profile(s) 103, 104, thereby allowing to reinforce the structural strength of the mounting of the half-cowl 31a.

These ribs 107 extend protruding from the outer faces of the corresponding transverse profiles 103, 104, located and directed toward the outer half-shroud 310 of the half-cowl 31a when the intermediate support frame 100 is mounted on the thrust reverser.

Moreover, the sliding of the movable cowl between its direct jet and reverse jet positions is provided by cylinder-type actuating means 80 distributed over the periphery of the nacelle and visible in FIGS. 2 and 3.

Conventionally, these cylinders are secured upstream on the front frame, and downstream inside the movable cowl, via adapted fittings.

More precisely, the actuating rods of these cylinders pass through the rear frame 60 of the deflection cascades 32 to cooperate with the half-cowl 31a.

Moreover, in another form of the present disclosure, a portion of the deflection cascades 32 of the thrust reverser device 30 is interchangeable.

This allows adjusting the configurations of the cascades 32 depending on the position of the nacelle (right wing or left wing, the configurations of the left half thrust reverser and the right half thrust reverser being neither identical nor symmetrical) and installing solid cascades (called blank off) when the aerodynamic fairing panel 33 is secured on the beam 50 in order to avoid that the air flow pulls off the panel 33 during the thrust reversal.

In a second form more particularly illustrated in FIGS. 7 to 15 in several variants, in order to provide the particular displacements of the half-cowl 31a and allow attaching of the latter on the nacelle, the guiding assembly 110 of the half-cowl 31a is directly mounted, at an upstream end, on the front frame 80 and, at a downstream end, on the rear frame 60, by respectively upstream and downstream connecting means.

These respectively upstream and downstream connecting means are configured to angularly shift relative to the half-beam 50, in a plane radial to the longitudinal axis X, the guiding assembly 110 of the half-cowl 31a.

In this second form, the intermediate support frame is hence removed and replaced by one or several upstream suspension fastener(s) of the guiding assembly 110 on the front frame 80 and one or several downstream suspension fastener(s) of the guiding assembly 110 on the rear frame 60.

As in the first form, this translational guiding assembly 110 of the half-cowl 31a is constituted, in a non-restrictive manner, of a rail 111-slide 112 assembly extending along the longitudinal axis X of the nacelle 2, on either side of the suspension pylon 10.

Figure 7:
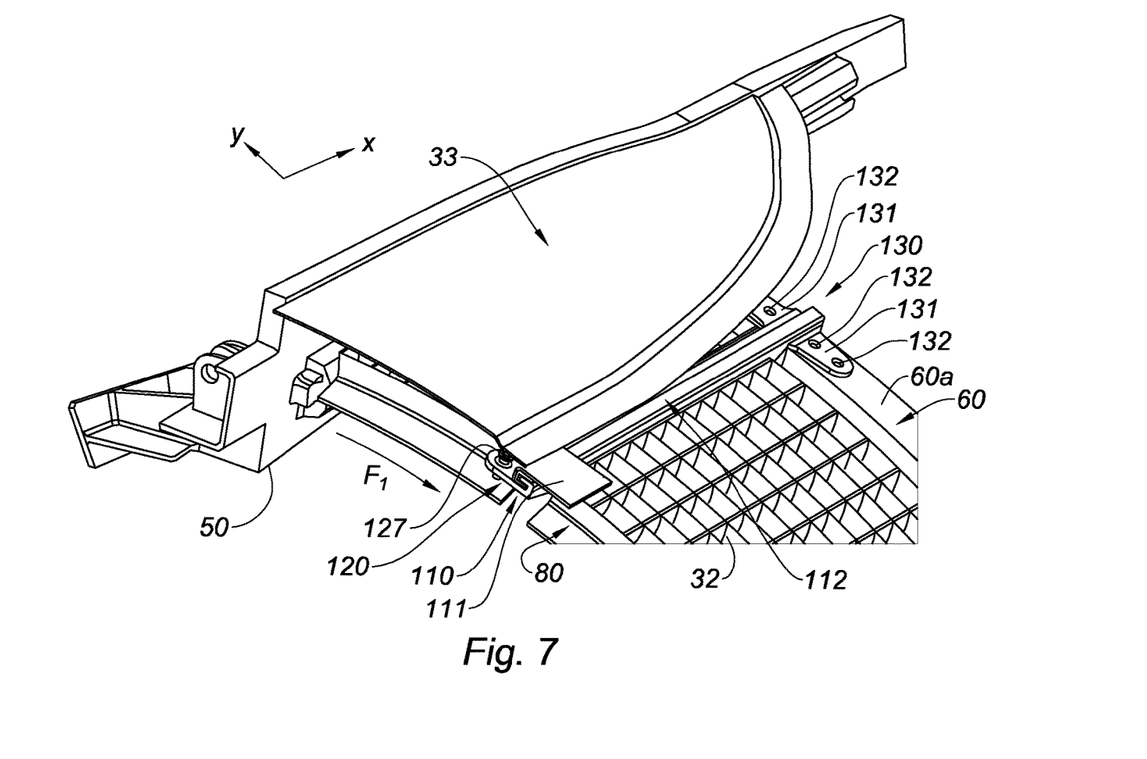
FIG. 7 is a partial perspective view of a thrust reverser according to a second form of the present disclosure.

As illustrated in particular in FIG. 7 and similarly to the first form, mounting of the rail 111-slide 112 guiding assembly 110 on the front frame 80 and the rear frame 60 and sliding of the half-cowl 31a (not visible in this figure) are offset relative to the half-beam 50 in the direction of the arrow F1.

The angular or circumferential shift of the rail-slide guiding assembly 110 is determined so as to arrange the rail-slide guiding assembly 110 of the half-cowl 31a at an angular distance from the half-beam 50 larger than or equal to the angular distance at which is located the free lateral end of the aerodynamic fairing panel 33 mounted on the corresponding half-beam 50.

Thereby, the area located under the fairing panel 33 is cleared so that the guiding assembly 110 of the half-cowl 31a on the corresponding half-beam 50 no longer interferes with the fairing panel 33.

Thus, the cantilever of the guiding means 110 of the half-cowl 31a relative to the corresponding half-beam 50 is reduced.

This fairing panel 33 is no longer an obstacle to the proper operation of the sliding of the thrust reverser cowl 31 between its direct jet and reverse jet positions.

Concerning the mounting of the rail 111-slide 112 guiding assembly 110 on the front frame 80, means providing the angular shift of the guiding assembly 110 relative to the corresponding half-beam 50 comprise upstream connecting means 120 enabling at least one rotation of the guiding assembly 110 relative to the front frame 80.

Figure 11:
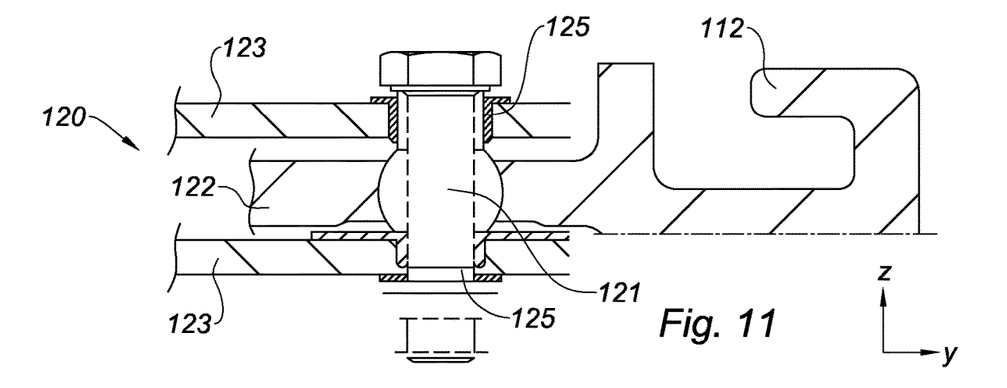
FIG. 11 is a sectional view in a plane YZ of an upstream fastener of a guiding assembly of a thrust reverser cowl according to the variant of FIG. 9, on a front frame of a fixed structure of the nacelle of FIG. 1.
Figure 12:
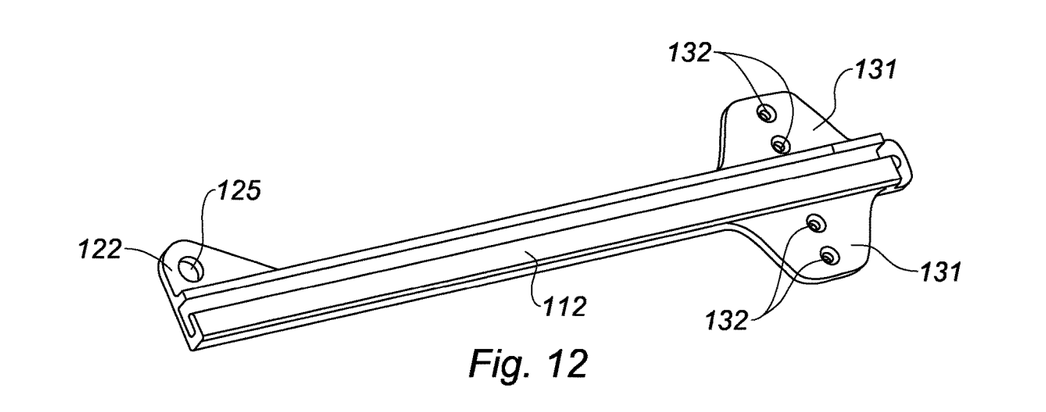
FIG. 12 is a perspective view of a portion of the guiding assembly of FIG. 11 according to the a variant of the thrust reverser of FIG. 9.

In a first variant illustrated in FIGS. 9, 11 and 12, the upstream connecting means 120 enable any rotation of the guiding assembly 110 relative to the front frame 80 on which it is mounted.

More particularly, the upstream connecting means 120 are designed to provide a ball-joint type connection between the front frame 80 and the upstream end of the guiding assembly 110.

The description which follows is made with reference to the slide 112 of the guiding assembly 110 only, given that it also applies to the rail 111 if it is the latter which has to be secured on the front frame 80 and the rear frame 60 rather than on the half-cowl 31a, 31b to be displaced.

In the first variant, the slide 112 is mounted, at its upstream end, via an anchor point angularly shifted from the corresponding half-beam 50 on the front frame 80.

The upstream end of the slide 112 is articulated on the front frame 80 by a ball-joint axis 121.

More precisely, the upstream end of the slide 112 is provided with a male attaching clevis 122 to cooperate with two female attaching clevisses 123 arranged on an attaching support 124 secured to the outer face 80a of the front frame 80 extending in a plane yz facing the flow deflection cascades 32.

It is to be noted that this attaching support 124 may be arranged on the opposite inner face of the front frame 80 in a variant to improve the overall dimension of the mounting.

The attaching support 124 is mounted on the outer face 80a of the front frame 80 via adapted securing means.

It may be in particular formed integrally with the front frame 80.

This attaching support 124 comprises the pair of attaching clevisses 123 parallel to the plane XY, spaced along Z and intended to cooperate with the male clevis 122 of the upstream end of the slide 112.

Figure 10:
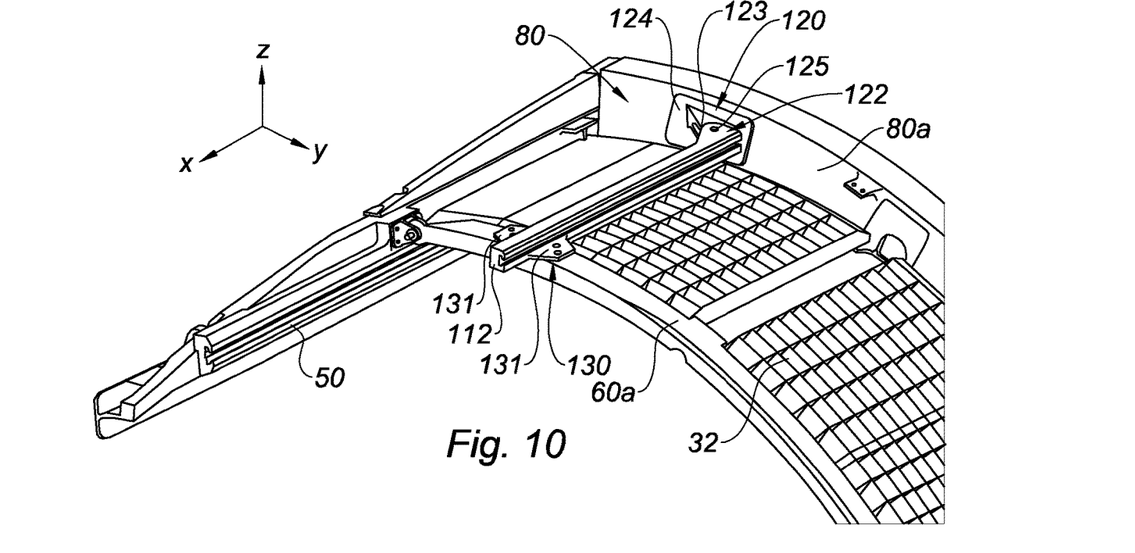
FIG. 10 is a view similar to that of FIG. 9 of another variant of the thrust reverser according to a second form of the present disclosure of FIG. 7, as observed from the downstream of the nacelle.

As a variant illustrated in FIG. 10, the attaching support 124 can be provided with a clevis 123 to cooperate with two clevisses 122 arranged on the corresponding slide 112.

Each of these clevisses 123 is provided with an eyelet 125 arranged facing eyelets 125 arranged on the clevis 122 of the corresponding slide 112.

These different eyelets 125 are adapted to receive connecting means 121 intended to connect the different clevisses there between.

These connecting means comprise the aforementioned ball-joint axis 121 extending along the axis Z, as illustrated in FIG. 11.

In a second variant illustrated in FIGS. 7, and 13 to 15, the upstream connecting means 120 between the front frame 80 and the guiding slide 112 enable only rotation about Z of the guiding assembly 110 relative to the front frame 80 on which it is mounted.

The prevention of rotation about the axis X allows avoiding any disengagement of the slide 112 off the front frame 80.

In this context, the upstream connecting means 120 comprise a first ball-joint type connection between the upstream end of the slide 112 and the outer face 80a of the front frame 80.

This ball-joint type connection can be realized by the cooperation of an axis 126 secured to the upstream end of the slide 112 and adapted to cooperate with a ball-joint 127 (illustrated in particular in FIGS. 7 and 14) crimped into an adapted orifice arranged on the outer face 80a of the front frame 80.

This axis 126 extends along X.

This ball-joint type connection is associated to a second connection between the front frame 80 and the slide 112, this second connection comprising an element 128 preventing rotation of the slide 112 about X.

This element 128 comprises a blocking finger 128 extending along the axis X and adapted to cooperate with a through orifice 129 having adapted dimensions and arranged on the front frame 80.

In addition, in a variant, the blocking finger 128 may be coated over its circumference with a friction-resistant material 128a.

In a non-restrictive example, this material may be TEFLON.

Regardless of the variant of the upstream connecting means 120 between the front frame 80 and the guiding assembly 110, this second form allows providing a more flexible mounting of the guiding assembly 110 on the fixed structure of the nacelle 2 by enabling degrees of freedom at the fastening points of the guiding assembly 110 on the front frame 80.

This offers the advantage of reducing the loads which pass through the guiding assembly 110 of the thrust reverser half-cowl 31a, 31b while reducing the mass of the thrust reverser device.

Concerning the mounting of the rail 111-slide 112 guiding assembly 110 on the rear frame 60, means providing the angular shift of the guiding assembly 110 relative to the corresponding half-beam 50 comprise downstream connecting means 130 providing a rigid connection between the downstream end of the slide 112 and the rear frame 60, angularly shifted relative to the corresponding half-beam 50.

Referring to FIGS. 7 to 10 and 12, the downstream connecting means 130 provide a plane bearing connection between the downstream end of the slide 112 and an upper face 60a of the rear frame 60 directed toward the outside of the nacelle 2.

In this context, the downstream end of the slide 112 comprises at least one attaching fin 131 extending generally in a plane xy intended to rest on the upper face 60a of the rear frame 60 to be secured thereto thereafter.

In addition, one or several through orifice(s) 132 adapted to receive securing means 133 (illustrated in FIG. 8) intended to secure the rear frame 60 and the slide 112 are distributed over these fins 131 and over the rear frame 60.

In a non-restrictive form of the present disclosure, securing the downstream end of the slide 112 on the rear frame 60 is provided by axial connections along Z.

There may be provided, in particular but not exclusively, screwing means 133 of the screws or pins type or any other adapted securing element.

Figure 13:
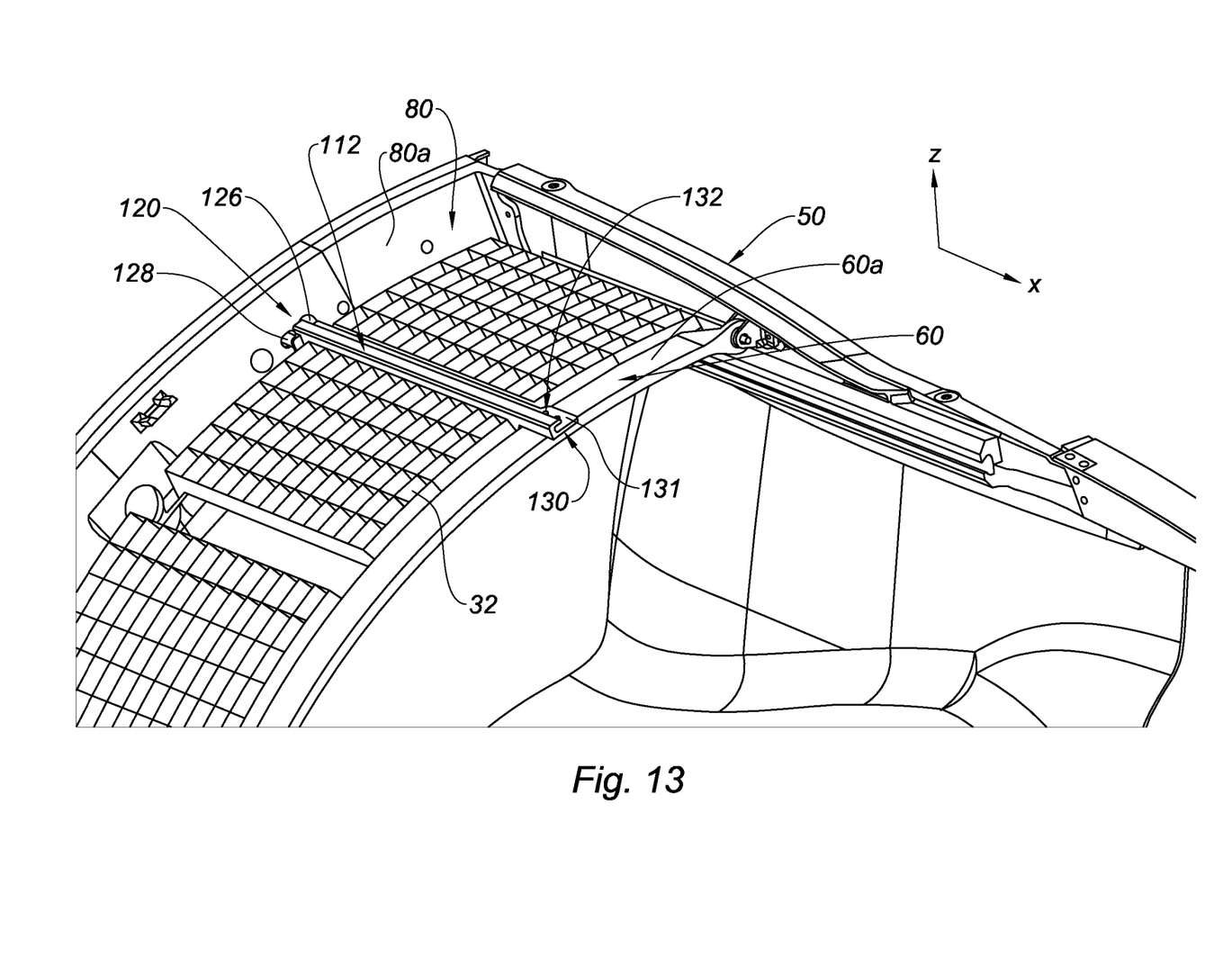
FIG. 13 is a partial perspective view of a variant of the thrust reverser according to a second form of the present disclosure of FIG. 7, as observed from the downstream of the nacelle.
Figure 14:
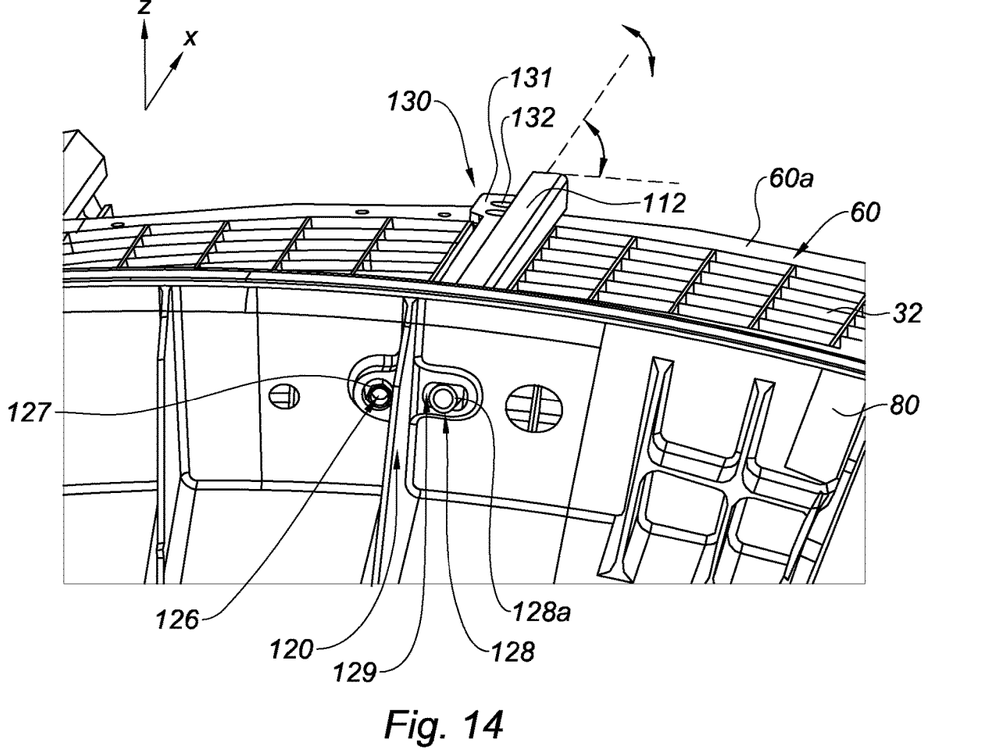
FIG. 14 is a view of the thrust reverser of FIG. 13 as observed from the upstream of the front frame of the fixed structure of the nacelle.
Figure 15:
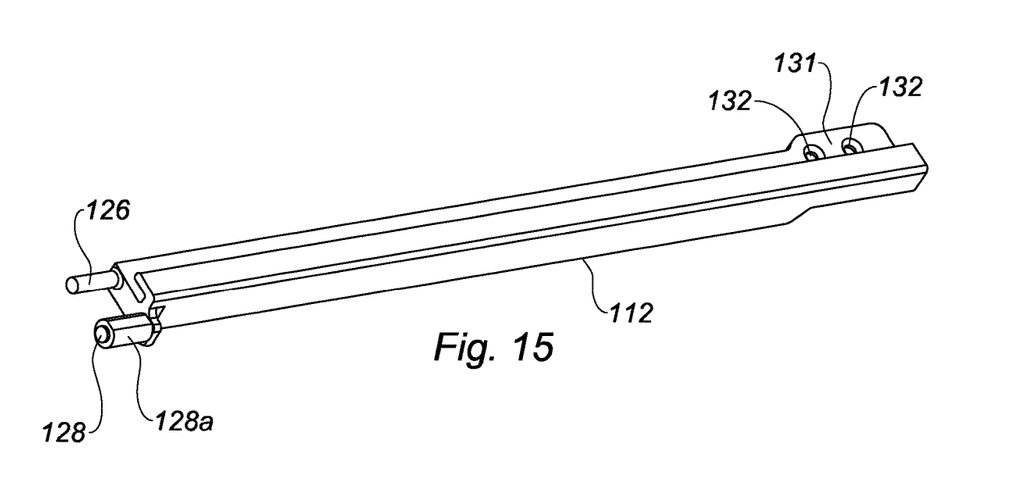
FIG. 15 is a perspective view of a portion of a guiding assembly according to the variant of the thrust reverser of FIGS. 13 and 14.

In FIGS. 7, 9, 10 and 12, the downstream end of the slide 112 comprises two attaching fins 131 on either side of the slide 112 whereas, in a variant illustrated in FIGS. 13 to 15, one single fin 131 is provided.

It is to be noted that these connections may be of the <<fail-safe>> type.

Concerning more particularly the guiding means 110 in the first or second form, as aforementioned, their shape is not limited to those described with reference to the two forms of the present disclosure and any other shape may be considered.

Thus, the shape of a longitudinal groove extending along the axis X, cylindrical, partially open of the slide 112, illustrated in FIGS. 2 to 5, is not restrictive.

It is the same with the shape of a hook intended to cooperate with a complementary hook arranged on the corresponding rail 111 of the guiding assembly 110 illustrated in particular in FIGS. 7, 8, 13 to 15.

It goes without saying that the present disclosure is not limited to the sole forms of this thrust reverser, described above by way of examples, but it encompasses, on the contrary, all the variants.

What is claimed is:

1. A thrust reverser device for a turbojet engine nacelle comprising:
    a thrust reverser including a thrust reverser half-cowl;
    at least one cascade;
    at least one fixed support structure comprising a longitudinal support half-beam and an intermediate support frame, the longitudinal support half-beam supporting the thrust reverser half-cowl, the intermediate support frame opposing the longitudinal support half-beam and being spaced apart from the longitudinal support half-beam in a circumferential direction of the thrust reverser half-cowl, the thrust reverser half-cowl being pivotable around the longitudinal support half-beam;
    a guiding assembly for slidably mounting the thrust reverser half-cowl on the intermediate support frame of said at least one fixed support structure along a direction substantially parallel to a longitudinal axis of the thrust reverser device between a direct jet position and a thrust reversal position, wherein the thrust-reverser half-cowl opens a passage within the nacelle to direct cold air flow towards a front of the nacelle in the thrust reversal position and closes the passage in the direct jet position, wherein said guiding assembly is circumferentially spaced apart from the longitudinal support half-beam by said at least one fixed support structure in the circumferential direction of the thrust reverser half-cowl, and
    wherein the intermediate support frame is a separate member from the at least one cascade and is mounted between the at least one cascade and the thrust reverser half-cowl, wherein the intermediate support frame is mounted between the longitudinal support half-beam and the thrust reverser half-cowl, and is configured to angularly shift the guiding assembly relative to the longitudinal support half-beam in a plane radial to the longitudinal axis, wherein the intermediate support frame forms a frame which extends over the length of the half-beam and also extends over an angular sector of a nacelle front frame, and wherein the intermediate support frame comprises at least one recess adapted to receive and serve as a bearing surface for at least one flow deflection cascade between different profiles.

2. The thrust reverser device according to claim 1, wherein the intermediate support frame comprises:
two opposite lateral profiles extending over a length of the intermediate support frame, namely a first and a second lateral profiles;
two opposite transverse profiles extending over a width of the intermediate support frame, namely an upstream transverse profile and a downstream transverse profile; and
securing means arranged on the first lateral profile configured to secure the intermediate support frame on the longitudinal support half-beam,
wherein the guiding assembly is arranged on the second lateral profile, the second lateral profile being the longitudinal portion of the at least one fixed structure.

3. The thrust reverser device according to claim 2, wherein the securing means comprise a peripheral connecting flange which lies in a plane perpendicular to the upstream and downstream transverse profiles.

4. The thrust reverser device according to claim 2, wherein the second lateral profile comprises at least one longitudinal guiding slide capable of cooperating with a guiding rail mounted on said thrust reverser half-cowl or vice versa to provide sliding of the thrust reverser half-cowl between the direct jet position and the thrust reversal position or vice versa.

5. The thrust reverser device according to claim 4, wherein the guiding rail is associated to a retaining rod supporting a skid mounted on an outer half-shroud of the thrust reverser half-cowl and connects the outer half-shroud of the thrust reverser half-cowl to the at least one longitudinal guiding slide, the retaining rod being straight or bent.

6. The thrust reverser device according to claim 4, wherein the intermediate support frame prevents jamming of the guiding rail in the at least one longitudinal guiding slides.

7. The thrust reverser device according to claim 2, wherein the intermediate support frame further comprises upstream connecting means arranged on an upstream transverse edge configured to connect the intermediate support frame on the nacelle front frame, the upstream connecting means being configured to include an overlapping connection of the intermediate support frame and the front frame, and comprise one or several through orifice(s) adapted to receive securing means configured to secure the intermediate support frame and the front frame.

8. The thrust reverser device according to claim 2, wherein the intermediate support frame further comprises one or several reinforcing rib(s) for taking up transverse loads formed on one or several of the transverse profiles.

9. The thrust reverser device according to claim 1, wherein the intermediate support frame is shaped so that the guiding assembly is arranged around said longitudinal axis at an angular distance from the longitudinal support half-beam larger than or equal to an angular distance between a free longitudinal end of an aerodynamic fairing panel mounted on the longitudinal support half-beam.

10. The thrust reverser device according to claim 1, wherein a rear frame is rotatably mounted to the intermediate support frame.

11. The thrust reverser device according to claim 10, wherein the intermediate support frame comprises downstream connecting means arranged on a downstream transverse edge configured to provide a pivot connection between the rear frame and the intermediate support frame.

12. The thrust reverser device according to claim 1, wherein said at least one fixed support structure further comprises:
complementary downstream connecting means arranged on the guiding assembly and a rear frame and configured to provide a connection between the rear frame and the guiding assembly; and
complementary upstream connecting means arranged on the guiding assembly and a front frame and configured to provide a connection between the guiding assembly and the front frame.

13. The thrust reverser device according to claim 12, wherein the upstream connecting means rotatably mounts the guiding assembly to the front frame.

14. The thrust reverser device according to claim 13, wherein the upstream connecting means are configured to provide a pivot connection between the front frame and an upstream end of the guiding assembly.

15. The thrust reverser device according to claim 12, wherein the upstream connecting means prevents any rotation about the longitudinal axis of the guiding assembly relative to the front frame on which the guiding assembly is mounted.

16. The thrust reverser device according to claim 15, wherein the upstream connecting means is configured to provide a pivot connection between the guiding assembly and the front frame associated with an element preventing the rotation about the longitudinal axis of the guiding assembly.

17. The thrust reverser device according to claim 16, wherein said element preventing the rotation comprises a blocking finger extending along the longitudinal axis and adapted to cooperate with a through orifice arranged on the front frame.

18. A turbojet engine nacelle comprising the thrust reverser device according to claim 1.

19. The thrust reverser device according to claim 1 further comprising a fairing mounted on the longitudinal support half-beam, wherein the intermediate support frame is mounted between the at least one cascade and the fairing.

* * * * *